Sept. 30, 1969    R. I. GARDNER    3,469,502
BELLOWS
Filed Feb. 9, 1967    3 Sheets-Sheet 3
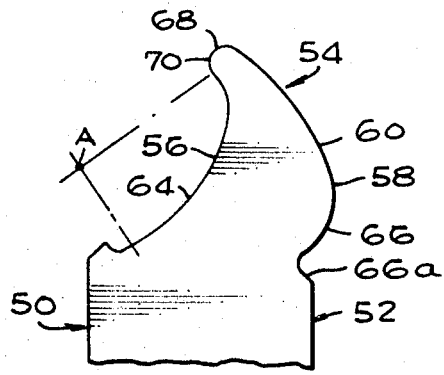
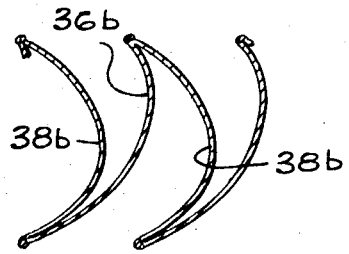
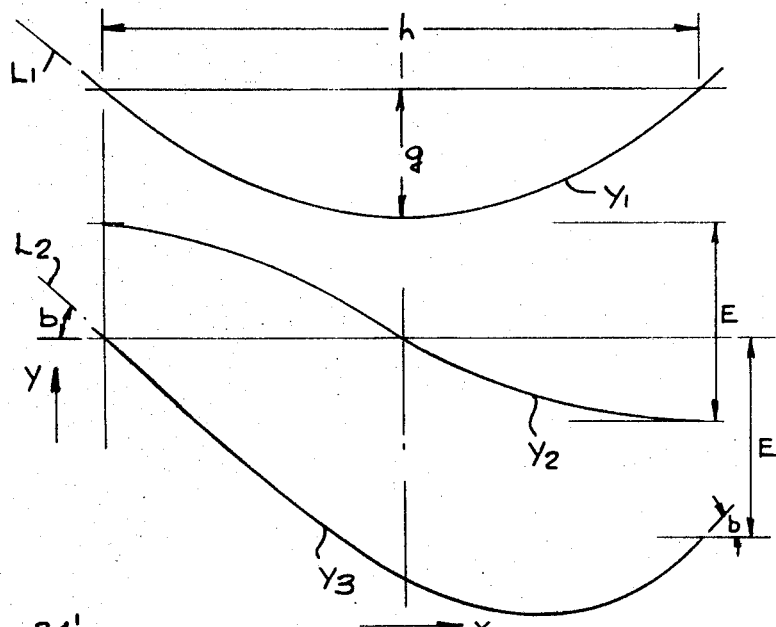
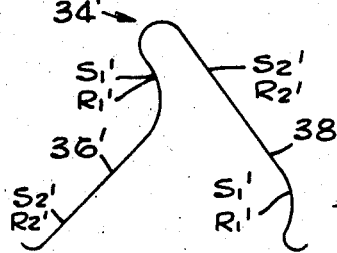
Robert I. Gardner
INVENTOR.
BY R.E. Granger
ATTORNEY United States Patent Office 3,469,502
Patented Sept. 30, 1969

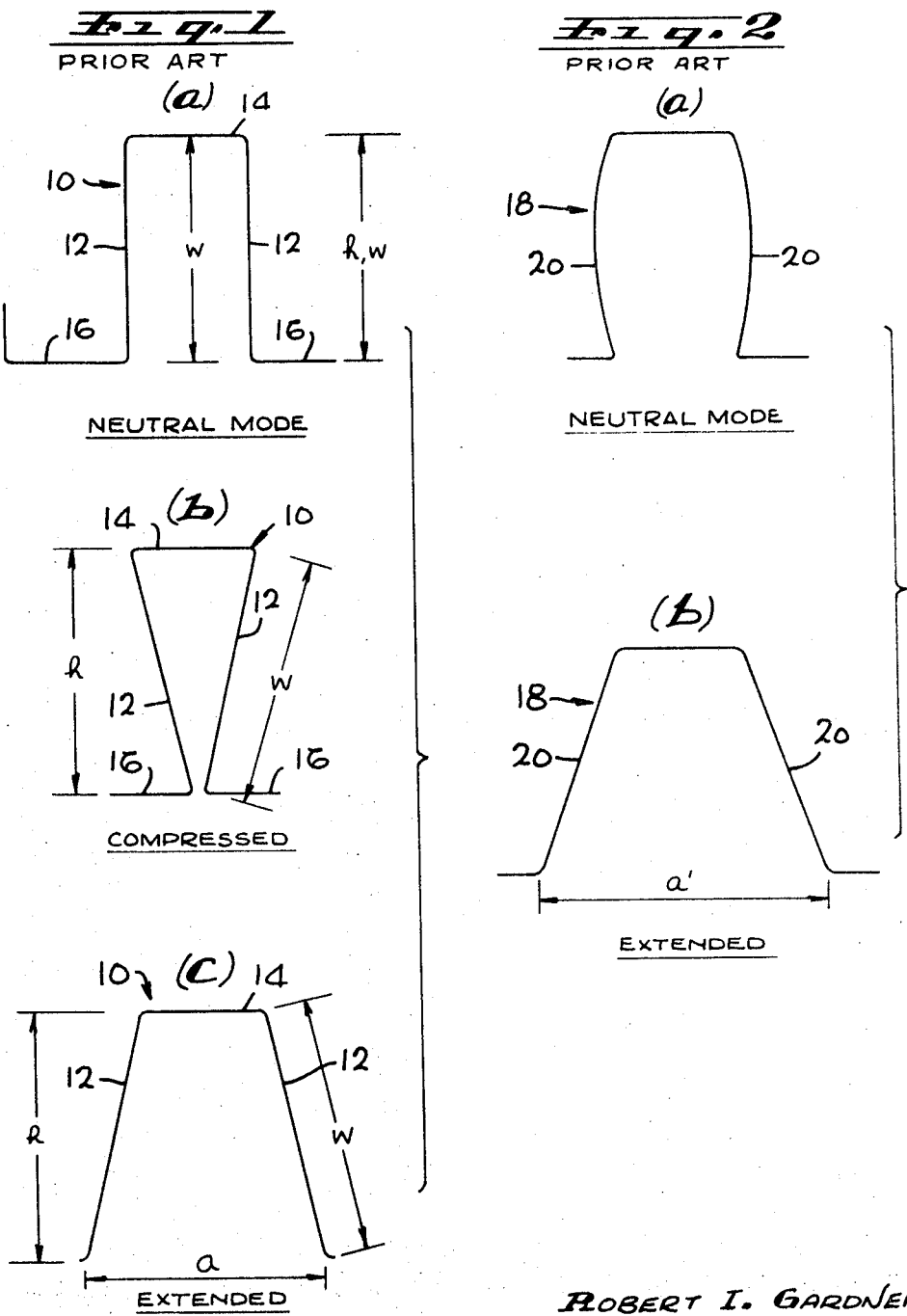

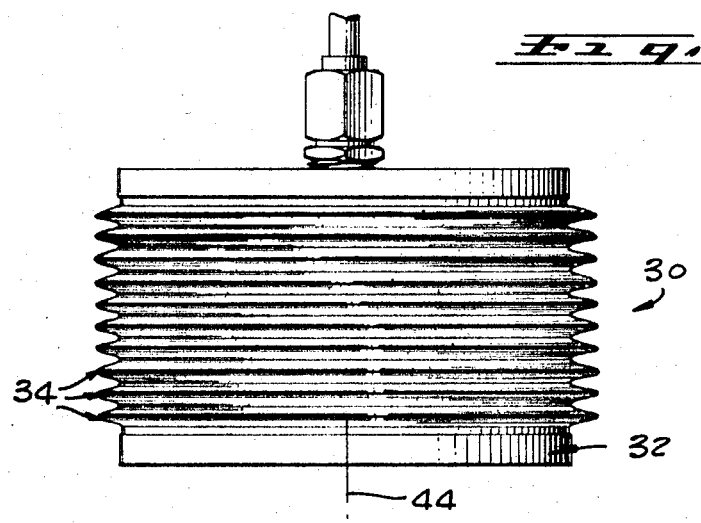
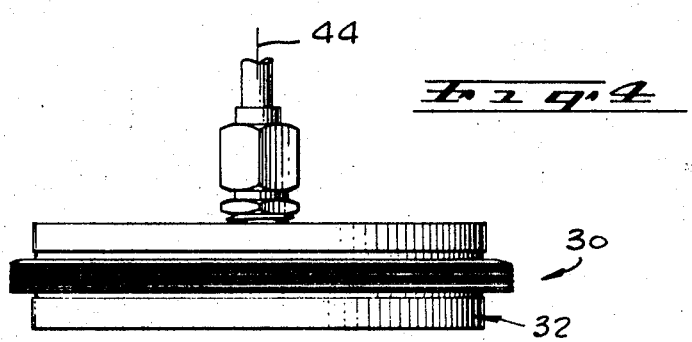
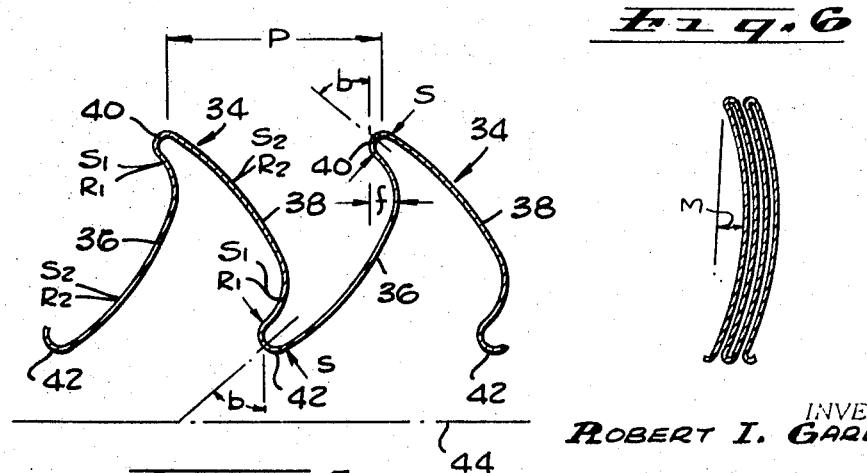

3,469,502
BELLOWS
Robert I. Gardner, 9750 Amestoy Ave.,
Northridge, Calif. 91324
Filed Feb. 9, 1967, Ser. No. 614,901
Int. Cl. F01b *19/04;* F16j *3/00;* B23p *15/28*
U.S. Cl. 92—34                             7 Claims

ABSTRACT OF THE DISCLOSURE

A flexible bellows characterized by a nesting convolution contour and a relatively large deflection ratio on the order of 20 to 30 or higher.

---

This invention relates generally to fluid pressure devices and, more particularly, to a new and improved bellows characterized by a novel convolution contour and a relatively large deflection ratio.

Generally speaking, a bellows is a tubular vessel, the wall of which is convoluted in such a way as to render the vessel axially compressible and extendible. As will be explained presently, such a bellows is characterized by a maximum range of deflection beyond which the bellows may not be extended and compressed without buckling of the walls of the bellows convolutions or other damage. Stated another way, a bellows has limiting conditions or modes of compression and extension beyond which the bellows may not be deformed without damage. In the ensuing description, these limiting modes are referred to, respectively, as a limiting mode of extreme compression and a limiting mode of extreme extension.

Bellows have various critical parameters which afford a basis of comparison of different bellows and determine the suitability of a bellows for a particular application. Among the more important of these critical parameters is deflection ratio. The deflection ratio of a bellows is the ratio of the length of the bellows in its limiting mode of extreme extension to the length of the bellows in its limiting mode of extreme compression. One of the major deficiencies of the existing bellows resides in their relatively small maximum deflection ratios. Thus, the existing bellows are characterized by maximum deflection ratios on the order of 3.5 to 5.5. These small deflection ratios limit the possible applications of the bellows The present invention provides a bellows which is characterized by a relatively large deflection ratio, far exceeding the deflection ratios of the existing bellows. A bellows according to the present invention, for example, may have a deflection ratio on the order of 20 to 30 or higher. These high deflection ratios accommodate the present bellows to a wide variety of highly useful and beneficial applications from which the existing bellows are excluded. For example, a bellows according to the invention may be sealed at its ends and provided with valved fluid passages in such a way as to form a positive displacement pump having a relatively large displacement volume. Other applications of the bellows will become readily evident as the description proceeds.

The present invention achieves its high deflection ratios by providing a bellows having a novel convolution contour. Convolution contour refers to the geometric shape or configuration of the transverse convolution sidewall sections defined by the inter-section of the annular convolution sidewalls with a plane containing the axis of the bellows. In the ensuing description, these sections are referred to as convolution sidewall sections, or simply sidewall sections. The convolution contour of the present bellows is made such as to enable the convolution sidewalls to nest during deflection of the bellows to its limiting mode of extreme compression and to undergo maximum separation without buckling or other damage during deflection of the bellows to its limiting mode of extreme extension. According to the present invention, this is accomplished by forming the bellows convolutions in a partially extended mode, i.e. a condition or mode of bellows deflection intermediate its limiting modes of extreme compression and extreme extension, to an arcuate shape which provides each annular convolution with a concave sidewall and a convex sidewall. The corresponding sidewalls of all of the convolutions face in the same direction, whereby the concave sides all face one end of the bellows and the convex sides all face the opposite end of the bellows. The two sidewall sections of each convolution defined by the inter-section of the sidewall with a plane containing the axis of the bellows, are located at opposite sides of and are symmetrical about the axis because of the generally tubular shape of the bellows. Moreover, the several sidewall sections have substantially the same geometric configuration or shape in the partially extended as-formed mode of the bellows and conform approximately to an ideal curve which is characterized by progressively increasing curvature in one direction along the curve. Accordingly, each annular convolution sidewall is characterized by an annular region of pronounced curvature adjacent one perimeter of the wall. In the preferred embodiment of the invention, the convolution sidewall sections conform closely to the ideal curve, whereby the curvature of each convolution sidewall changes progressively as the sidewall is radially traversed. As will be explained presently, however, a bellows according to the invention may be constructed with convolution sidewall sections which only approximate the ideal curve. For example, each convolution sidewall may have an annular pronounced curvature region of constant radius adjacent one perimeter and a frustoconical region adjacent its other perimeter which merges tangentially with the pronounced curvature region. In the completed bellows of the invention, the curvature of the two sidewalls of each bellows convolution are reversed in such a way that the annular regions of pronounced curvature of alternate convolution sidewalls are located adjacent the roots of the convolutions and the annular regions of pronounced curvature of the intervening convolution sidewalls are located adjacent the crests of the convolutions. As will appear in the ensuing description, the unique convolution contour and reversed convolution sidewall curvature of the present bellows cooperate to achieve the high order deflection ratios contemplated by the invention.

An important aspect of the invention is concerned with novel methods of deriving the ideal convolution sidewall curvature which achieves the high deflection ratios of the invention. Briefly, these methods involve the analytical or mathematical summation of a curve representing a buckled pin-ended column and a curve representing a column with fixed ends which are translated relative to one another along parallel direction lines. As will appear presently, these analytical and mathematical methods of deriving the ideal convolution sidewall curvature are based on the similarity between the stresses and motions which occur in the convolution sidewalls of a bellows during deflection and the stresses and motions which occur in a column with pinned ends which is initially buckled by the application of a compression load, the column ends next being fixed, and the column being then stressed by relative translation of the column ends along parallel direction lines.

As will appear from the ensuing description, an improved bellows according to the invention may be fabricated by any of the conventional bellows fabricating techniques, to wit, cold-forming, welding, electrolytic and chemical deposition, and machining. Since these fabricating methods are well known and understood, they need not be explained in detail here. However, a further important aspect of the invention is concerned with fabrication of the present bellows by electrolytic deposition. According to this aspect, the invention provides a unique cutting tool for machining the mandrel on which the bellows is electrolytically deposited to provide the mandrel with grooves of the proper cross section to form the unique convolution contour of the invention. This tool has a cutting tip which is shaped to define cutting edges conforming to the desired convolution contour and is rotatably mounted in such a way as to permit the tool to be fed into the mandrel with a rotary motion which results in forming or cutting of the desired grooves in the mandrel.

It is a general object of the present invention, therefore, to provide a new and improved bellows characterized by a relatively high deflection ratio on the order of 20 to 30 or higher.

A more specific object of the invention is to provide a bellows of the character described having a unique convolution contour which enables the convolution sidewalls of the bellows to nest during deflection of the bellows to its limiting mode of extreme compression and to separate a maximum distance during deflection of the bellows to its limiting mode of extreme extension, thus to achieve a high order deflection ratio.

Another object of the invention is to provide a bellows of the character described which may be fabricated by any of the known bellows fabricating techniques.

A related object of the invention is to provide a cutting tool for machining a mandrel on which a bellows of the invention may be electrolytically deposited.

A further object of the invention is to provide a bellows of the character described which is relatively simple in construction, economical to manufacture, reliable in operation, capable of a wide variety of applications, and is otherwise ideally suited to its intended purpose.

Other objects, advantages, and features of the invention will become readily evident as the description proceeds.

The invention will now be described in detail by reference to the attached drawings wherein:

FIGURE 1 illustrates sections through a conventional bellows convolution in its neutral, compressed, and extended modes, respectively;

FIGURE 2 illustrates another type of conventional bellows convolution in its neutral and extended modes;

FIGURE 3 is a side elevation of an improved bellows according to the invention in its extended mode;

FIGURE 4 illustrates the bellows of FIGURE 3 in its limiting mode of extreme compression;

FIGURE 5 is an enlarged section through two adjacent convolutions of the bellows of FIGURES 3 and 4 showing the convolutions in their as-formed partially extended mode;

FIGURE 6 illustrates the convolutions of FIGURE 5 in a partially compressed or neutral mode, limiting mode of extreme compression;

FIGURE 7 is a section through a bellows convolution according to the invention having a slightly modified convolution contour;

FIGURE 8 graphically illustrates the method of deriving the ideal convolution contour of the present bellows;

FIGURE 9 illustrates a tool for use in machining a mandrel for forming the present bellows; and FIGURE 10 is a section through a welded bellows according to the invention.

Before proceeding with a detailed description of the present invention, it is deemed advisable to briefly consider the actions and stresses which occur in a conventional bellows during axial deflection of the bellows. In FIGURE 1, for example, there is illustrated an idealized bellows convolution 10 of the general kind which is embodied in many existing bellows, notably conventional roll-formed or corrugated bellows. FIGURE 1a illustrates the convolution 10 in its neutral mode, FIGURE 1b illustrates the convolution in its limiting mode of extreme compression, and FIGURE 1c illustrates the convolution in its limiting mode of extreme extension. In the following discussion, it is assumed that all flexing is localized at the junction of the sidewalls 12, crest wall 14, and root walls 16 of the convolution. Also, the convolution shape has been idealized in order to more clearly demonstrate the essential elements of the convolution and its actions during deflection. In this regard, for example, the crest wall 14 and the root walls 16 of the convolution have been illustrated as flat, whereas in a typical convolution of this type, the crest and root walls are curved and merged tangentially with the convolution sidewalls.

It has been determined that during axial deflection of a bellows embodying the convolution, the internal and external diameters of the convolution, and hence its radial height $h$, remain essentially constant. It is obvious, therefore, that the radial width $w$ if each convolution sidewall 12, measured bttween the junctions of the sidewall with the crest wall 14 and the corresponding root wall 16, changes during axial deflection of the convolution. Thus, deflection of the convolution 10 from its neutral mode of FIGURE 1a to either of its limiting modes of FIGURES 1b or 1c results in an increase in the sidewall width $w$. Similarly, deflection of the convolution from either of its limiting modes to its neutral mode results in a decrease in the sidewall width. Owing to the fact that bellows are constructed of an elastic material, such as metal, the convolution sidewalls 12 exhibit a predetermined stress-strain relationship in response to this changing sidewall width $w$. Thus, depending upon the normal or zero stress mode of the convolution 10, the convolution sidewalls 12 will be radially stressed either in tension or compression as the convolution is deflected from its neutral mode to either limiting mode and, conversely, in compression of tension, as the case may be, as the convolution is deflected back to its neutral mode. In other words, the net radial stress in the convolution sidewalls 12 at any mode of deflection of the convolution 10 will depend upon the deflected mode of the convolution for zero stress. The two extremes are zero stress at the neutral mode and zero stress at either limiting mode. If the convolution is designed for zero stress in the neutral mode, deflection of the convolution from this mode to either limiting mode stresses the convolution sidewalls 12 in radial tension, thereby producing a net radial tension stress in the convolution 10. On the other hand, if the convolution is designed for zero stress in either limiting mode, deflection of the convolution from either limiting mode to the neutral mode stresses the convolution sidewalls 12 in radial compression, thereby producing a net radial compression stress in the convolution 10. It can be demonstrated that a net radial tension stress in the convolution is accompanied by circumferential compression stress at the crest and circumferential tension stress at the root of the convolution, while a net radial compression stress in the convolution is accompanied by a circumferential tension stress at the crest and a circumferential compression stress at the root of the convolution. In either event, the circumferential stress in the convolution changes progressively from compression to tension or from tension to compression, as the case may be, as the convolution is traversed between root and crest. These circumferential stresses produce force reactions along the axis of the bellows which create an axial stiffness in the bellows in addition to that resulting from the bending stresses existing at the junctions of the convolution side, crest and root walls.

Earlier reference was made to limiting modes of extreme compression and extreme extension. The limiting mode of extreme extension occurs in a bellows designed for zero stress in the neutral mode when the increasing bellows stiffness resulting from the circumferential stresses in the bellows during extension produces a sufficient axial force reaction to prevent further extension of the bellows or the circumferential compressive stress at the convolution crests cause buckling of the convolution crest walls 14. The limiting mode of extreme compression occurs in a bellows designed for zero stress in an extended mode when the increasing bellows stiffness during compression produces a sufficient axial force reaction to prevent further compression of the bellows or the compressive stress at the convolution roots causes circumferential buckling of the convolution root walls 16. These modes of extreme compression and extreme tension limit the existing bellows of the kind under discussion to the relatively low order of deflection ratios, mentioned earlier.

Some existing bellows, notably hydraulically formed bellows have convolutions which are characterized by outwardly arched or bowed sidewalls. FIGURE 2 illustrates one convolution 18 of a typical hydraulically formed bellows. It will be observed in this figures that the sidewalls 20 of the convolution bow or bulge outwardly away from one another when the convolution is in its neutral mode of FIGURE 2a. This outward bulge of the convolution sidewalls occurs in a hydraulically formed bellows as a result of the stresses which are created in the bellows wall by the hydraulic forming pressure and even through the convolution forming surfaces of the forming die are flat and final forming occurs in the neutral mode. This inadvertent collateral bulge of the convolution sidewalls 20 is beneficial for the reason that the bellows can sustain increased extension beyond the neutral mode. Thus, when the bellows is extended beyond the neutral mode, the bulge or arch in the convolution sidewalls is progressively reduced and the limiting mode of extreme extension does not occur until the bulge in the walls has been substantially eliminated as shown in FIGURE 2b, i.e. until the sidewall sections defined by the intersection of the convolution sidewalls 20 with a plane containing the bellows axis are approximately straight lines. This is due to the fact that curved convolution sidewalls offer substantially less resistance to radial extension and compression than do flat convolution sidewalls. This reduction in the resistance to radial extension and compression, in turn, is accompanied by a reduction in the circumferential compression at the convolution crests in a corresponding reduction in the axial stiffness of the bellows. As these are the factors which limit extension of a bellows, a bellows with arched or curved convolution sidewalls can sustain greater extension beyond the neutral mode than a bellows with flat convolution sidewalls.

It is evident at this point, therefore, that the convolution contour shown in FIGURE 2 is superior to that of FIGURE 1 from the standpoint of its increased deflection ratio in the range between the neutral mode and the limiting mode of extreme extension. The convolution contour of FIGURE 1, on the other hand, is superior to that of FIGURE 2 from the standpoint of its increased deflection ratio in the range between the neutral mode and the limiting mode of extreme compression. Thus, when a bellows having the convolution contour of FIGURE 2 is compressed beyond the neutral mode, the bulged or arched sidewalls 20 of the adjacent bellows convolutions abut one another before the bellows is axially compressed to its normal limiting mode of extreme compression, whereby the convolution contour of FIGURE 2 effectively limits compression of the bellows beyond the neutral mode. In this regard, then, the convolution contour of FIGURE 2 is limited to small compressive deflections beyond the neutral mode by abutment of the adjacent convolution sidewalls, whereby a bellows with the convolution contour of FIGURE 1 can sustain greater compression beyond the neutral mode than a bellows with the convolution contour of FIGURE 2.

It has been found that if a bellows with the flat walled convolution contour of FIGURE 1 is extended sufficiently, radial stretching of the convolution walls will result. This radial stretching occurs before the onset of circumferential buckling at the convolution crests. If the bellows is further compressed after such radial stretching, the convolution sidewalls assume a curvature or bulge, like that of FIGURE 2, which then limits compression of the bellows in much the same way as discussed above in connection with the convolution contour of FIGURE 2. In this regard, is has been determined that extensively deflecting a bellows with the flat walled convolution contour of FIGURE 1 beyond the neutral mode to a condition which is equivalent to straightening the natural bulge of a hydroformed bellows effectively reduced the overall deflection ratio of the bellows owing to the fact that the bulge in the convolution sidewalls created by such excessive extension deflection followed by compression deflection reduces the overall deflection ratio of the bellows to a greater extent than the excessive extension deflection increased the overall deflection ratio. Accordingly, a bellows having the convolution contour of FIGURE 1 or FIGURE 2 exhibits a definite maximum deflection ratio of the relatively lower order mentioned earlier.

The present invention utilizes the superior characteristics of both convolution contours of FIGURES 1 and 2 to achieve a bellows which is characterized by an overall deflection ratio far exceeding those of the existing bellows. As noted earlier, for example, a typical bellows according to the invention may have a deflection ratio on the order of 20 to 30, or higher.

The bellows 30 of the invention which has been selected for illustration in FIGURES 3–6 of the attached drawings comprises a generally tubular convoluted body 32 which is commonly constructed of metal. However, the invention is not limited to metal bellows. As noted earlier, the bellows in the invention may be fabricated by any of the well known bellows fabricating techniques including hydro-forming, machining, electrolytic and chemical deposition, and welding. The convoluted bellows wall 32 defines a number of axially spaced convolutions 34 having sidewalls 36, 38, crest walls 40, and root walls 42. The convolution sidewalls 36, 38 are generally annular in shape and are disposed in coaxial side by side spaced relation along the axis 44 of the bellows. Each sidewall 36 is integrally joined along its outer perimeter to the outer perimeter of one adjacent side wall 38 by the intervening crest wall 40 to define one convolution 34. Each side wall 36 is integrally jointed along its inner perimeter to the inner perimeter of the other adjacent sidewall 38 by the intervening root wall 42. The several sidewalls, crest walls, and root walls are thereby integrally joined to one another to form the convoluted body 30.

The major contribution of the present invention resides in the unique convolution contour of the bellows 30. In this regard, attention is directed to FIGURE 5 which is an enlarged longitudinal cross section through a number of the convolutions 34, that is a cross section taken in a plane containing the axis 44 of the bellows. It is obvious, because of the annular shape of the convolution sidewalsl 36, 38, that the intersection of this plane with each sidewall 36 defines a pair of sidewall sections which are located at opposite sides of and are symmetrical about the bellows axis 44. Similarly, the intersection of the plane with each sidewall 38 defines a pair of sidewall sections which are located at opposite sides of and are symmetrical about the bellows axis. For convenience, only the wall sections at one side of the axis are shown.

According to the present invention, the convolution sidewalls 36, 38 are arcuately formed in such a way that the several convolution sidewall sections have substantially the same geometric configuration or shape and conform approximately to an ideal curve which is characterized by progressively increasing curvature in one direction along the curve. As a consequence, each sidewall section is characterized by an end segment $S_1$ of pronounced curvature and an opposite relatively flat end segment $S_2$ which merges tangentially with the segment $S_1$ of pronounced curvature. Each full convolution sidewall 36, 38, therefore, is characterized by an annular region $R_1$ of pronounced curvature located adjacent one perimeter of the wall and a generally frusto-conical region $R_2$ located adjacent the other perimeter of the wall which merges tangentially with the annular region of pronounced curvature.

At this point, it is evident that each convolution sidewall 36, 38 has a concave side and a convex side. According to one feature of the invention, the sidewalls are arranged with their corresponding sides facing in the same axial direction of the bellows. Accordingly, the concave sides of all the convolutional sidewalls face one end of the bellows and the convex sides of all the sidewalls face the opposite end of the bellows. For convenience in the ensuing description, the end of the bellows toward which the concave sides of the convolution sidewalls face is referred to as the reference end. Each bellows convolution 34, therefore, has a side wall adjacent the reference end, i.e. side wall 36, and a sidewall remote from the reference end, i.e. sidewall 38. According to a further feature of the invention, the curvature of the two sidewalls 36, 38 of each convolution 34 is reversed in such a way that the annular region $R_1$ of pronounced curvature of the convolution sidewall adjacent the reference end of the bellows that is sidewall 36, is located adjacent the crest of the convolution, and the annular region $R_1$ of pronounced curvature of the other convolution sidewall 38 is located adjacent the root of the convolution.

It is evident at this point that the curvature of the convolution sidewall section shown in FIGURE 5 determines the overall shape or curvature of the complete convolution sidewalls 36, 38 and hence the convolution contour of the bellows 30. The manner in which the ideal curvature of the convolution sidewall sections is derived will be explained presently. Suffice it to say at this point that the bellows 30 under discussion constitutes a preferred embodiment of the invention wherein the convolution sidewall sections conform closely to the ideal curvature. Accordingly, the curvature of the convolution sidewalls 36 increases progressively from the convolution roots to the convolution crests, while the curvature of the convolution sidewalls 38 increases progressively from the convolution crests to the convolution roots. In some cases, on the other hand, it may be desirable to fabricate a bellows according to the invention with convolution sidewalls having a curvature which only approximates the ideal curvature. FIGURE 7 is a section through a convolution 34' of such a bellows. In this case, the convolution sidewalls 36', 38' are arcuately formed in such a way that the end segments $S_1'$ of the convolution sidewall sections have a constant curvature, that is they conform to a circular arc of given radius, and the opposite end segments $S_2'$ of these sidewall sections conform to straight lines. Accordingly, the annular regions $R_1'$ of pronounced curvature of the convolution sidewalls 36', 38' have a constant curvature and the opposite regions $R_2'$ of these walls are frusto-conical in shape. It is evident, therefore, that the curvature of the convolution sidewalls 36', 38', and hence the convolution contour of the modified bellows under consideration approximate the ideal convolution sidewall curvature and convolution contour of the invention, as represented by the preferred embodiment of bellows shown in FIGURE 5.

As noted earlier, bellows according to the invention are formed to the illustrated convolution contours in the partially extended mode. Forming the bellows to these convolution contours in the partially extended mode is highly advantageous for two reasons. In the first place, the illustrated convolution contours permit the bellows convolutions to nest when the bellows are compressed. In this regard, for example, attention is directed to FIGURE 6 which illustrates the bellows 30 in a partially compressed or neutral mode just short of its limiting mode of extreme compression. This nesting capability of the convolutions obviously maximizes the deflection of the bellows in the range between its as-formed mode of partial deflection and its limiting mode of extreme compression. Secondly, extension of the bellows beyond the as-formed mode of FIGURE 5 results in progressive flattening of the convolution sidewalls, thus permitting the bellows to sustain maximum extension in the range between the latter mode and the limiting mode of extreme extension. That is, the bulges necessary for extreme extension are present, but they are nesting in contrast to interfering as in FIGURE 2.

It is now evident, therefore, that bellows according to the present invention can sustain both maximum compression and maximum extension from their as-formed mode of partial deflection, whereby the present bellows exhibit a maximum overall deflection ratio far exceeding the deflection ratios of existing bellows. In this regard, it will be recalled that a typical bellows according to the invention may have an overall deflection ratio in the range of 20 to 30, or higher, as compared to the deflection ratios of 3.5 to 5.5 exhibited by typical conventional bellows. This extreme deflection ratio achieved by the present invention is evident from FIGURES 3 and 4 which represent an actual bellows according to the invention in a partially extended mode and its limiting mode of extreme compression, respectively.

It is obvious that the high deflection ratios achieved by the present invention are highly advantageous and beneficial in a great variety of bellows applications. For example, a positive displacement fluid pump having a large displacement volume may be constructed by sealing the ends of a present bellows and providing the latter with suitable passages and valve means for effecting a pumping action in response to alternate compression and extension of the bellows. The present bellows, of course, are susceptible of a wide variety of other useful applications.

Reference is now made to FIGURE 8 which illustrates the manner in which the ideal convolution sidewall curvature of the invention is derived. Briefly, this method involves the summation, by either graphical or mathematical techniques, of two geometric curves, one representing the curvature of a pin-ended column which is subjected to an endwise compressive buckling load and the other representing the curvature of a column with fixed ends which are translated relative to one another along parallel direction lines. The present method is founded, in part, on the basic premise that the present convolution sidewalls 36, 38 (or 36', 38') are curved in their as-formed mode of partial deflection, as necessary to achieve a maximum deflection ratio for the reasons explained earlier, and, in part, on the similarity between the actions and stresses which occur in these curved convolution sidewalls during extension and compression of the bellows and the actions and stresses which occur in a column which is initially subjected to an endwise compressive buckling load and whose ends are thereafter translated relative to one another along parallel direction lines without further rotation of the ends. In this regard, it is evident from the discussion thus far that each incremental radial section of each convolution sidewall 36, 38 of the present bellows defined by the intersection of the sidewall and a plane containing the bellows axis simulates a buckled column which is subjected to an endwise compressive buckling load and whose ends undergo relative translation along direction lines parallel to the bellows axis during axial compression and extension of the bellows. In the as-formed, partial deflection mode of the bellows, the ends of each column-simulating-sidewall section are displaced axially of the bellows axis, as shown in FIGURE 5. During extension of the bellows from this as-formed mode, the axial displacement of the ends of each column-simulating-section is increased and the curvature in the section is reduced. During compression of the bellows from its as-formed mode, the ends of each column-simulating-sidewall section undergo relative translation toward one another. Thus, the several incremental convolution sidewall sections defined by a common plane containing the bellows axis simulate a number of buckled columns which are disposed side by side along the axis and whose ends undergo relative translation parallel to the axis during deflection of the bellows. When the bellows is in its neutral mode of FIGURE 6, the ends of each of these column-simulating sections are located approximately in a common plane normal to the bellows axis. Deflection of the bellows between this neutral mode and its as-formed mode of FIGURE 5 results in relative displacement of the ends of each column-simulating section a distance approximately equal to one-half the relative displacement of the adjacent convolution crests (or roots).

At this point it is significant to recall that the nesting relationship of the bellows convolutions illustrated in FIGURE 6 is one of the primary contributing factors to the high deflection ratio achieved by the invention. The high deflection ratios contemplated by the invention, then, require a convolution sidewall curvature in the as-formed mode of the bellows which will yield the nesting relationship of FIGURE 6 when the bellows is compressed from its as-formed mode to its neutral, nearly compressed, mode. Recalling that the convolution sidewalls in this neutral mode simulate a series of buckled columns disposed with their ends in common planes normal to the bellows axis, it is obvious that the convolution sidewall curvature in the as-formed mode of the bellows which is necessary to achieve the present high deflection ratios may be defined in another way; that is to say, the as-formed convolution sidewall curvature must be such as to yield incremental convolution sidewall sections whose curvature (in the as-formed mode) approximates or conforms to the curvature of a buckled column of equal length whose ends have been translated or displaced along parallel direction lines a distance equal to one half the relative displacement of the adjacent convolution crests (or roots) of the present bellows during deflection between the neutral mode of FIGURE 6 and the as-formed mode of FIGURE 5.

The latter statement is, essentially, a statement of the present method of deriving the ideal curvature of the present convolution sidewalls. Thus, according to the present method of graphically deriving the ideal curvature, a basic curve $Y_1$ (FIGURE 8) is plotted which represents the curvature of a buckled column having a buckled length $h$ equal to the desired convolution height. This curve, then, represents the buckled column simulated by each of the incremental convolution sidewall sections of the bellows illustrated in FIGURE 6 in its neutral mode. Next, a second curve $Y_2$ is plotted which represents the curvature of a straight column of length $h$ with fixed ends which have been relatively displaced or translated along parallel direction lines a distance $E$ equal to one half the relative displacement of adjacent convolution crests (or roots) between the deflection modes of FIGURES 5 and 6. Finally, curves $Y_1$ and $Y_2$ are graphically added to one another to obtain a resultant curve $Y_3$ which defines, approximately, the curvature of a buckled column whose ends have been displaced relative to one another to the distance just mentioned. It is evident from the preceding discussion, then, that the curve $Y_3$ represents the ideal convolution sidewall curvature of the present bellows in its as-formed mode.

The ideal curve $Y_3$ may be derived mathematically. Thus, curve $Y_1$ referred to in the above graphic derivation may be defined by the equation:

$$Y_1 = g \sin \pi \frac{x}{h}$$

where:

$g$ is the amplitude of the curve at its center point (for optimum amplitude see later discussion)
$h$ is the convolution height Curve $Y_2$ may be defined by the equation:

$$Y_2 = \frac{E}{2}\left(1 + \cos \pi \frac{x}{h}\right)$$

Where E is one half the relative displacement of the adjacent convolution crests (or roots) of the preesnt bellows occasioned by deflection of the latter between its as-formed mode of partial deflection and its limiting mode of extreme compression.

The ideal curve $Y_3$ then, is defined by the summation of Equations 1 and 2 as follows:

$$Y_3 = g \sin \pi \frac{x}{h} + \frac{E}{2}\left(1 + \cos \pi \frac{x}{h}\right)$$

In the above derivations, it is assumed that the curvature of a buckled column subjected to endwise compressive loading conforms approximately to one half of a sine wave, as is actually the case. An approximation of the ideal convolution sidewall curvature necessary to obtain the high deflection ratios contemplated by the invention may be obtained by assuming that a buckled column conforms to a circular arc rather than a sine wave. This alternative method of approximating the ideal curvature was discussed earlier with reference to FIGURE 7.

It is now evident that the above described methods of deriving the ideal curvature of the convolution sidewalls of the present bellows results in a convolution contour which yields the high deflection ratios contemplated by the invention. As heretofore mentioned, bellows according to the invention may be designed to have deflection ratios in the range of 20 to 30 or higher.

The buckled column analogy utilized inthe above derivations of the ideal convolution sidewall curvature is valid for the reason that buckling does, in fact, occur in the convolution sidewalls when a present bellows is compressed. Because of the fact that such buckling is generally uncontrolled, the convolution sidewall curvature employed in the present bellows preferaby embodies features which control such buckling, thus to enable the bellows convolutions to nest efficiently in their final compressed or buckled condition. According to one of these features, the convolution sidewalls are designed to exhibit a buckled shape (in the neutral mode) which is symmetrical about their mid-height positions for the reason that the two sidewalls of each convolution conform to the same curve but are inverted about the mid-height position. Another feature resides in the fact that the convolutions are so designed that buckling is substantially the same for both sidewalls of each convolution. A final feature involves the fact that the convolution sidewalls are shaped to form a single arc during buckling, since multiple arching of the sidewalls, as occurs in some existing bellows, prevents efficient nesting of the adjacent convolutions in the compressed mode of the bellows.

The amplitude $g$ of the buckled column curve $Y_1$ in FIGURE 8 is not critical in determining or deriving the ideal convolution sidewall curvature of the invention. However, it has been determined that an amplitude which places the tangent line $L_1$ to the curve $Y_1$ in FIGURE 8 parallel to the line $L_2$ joining the ends of curve $Y_3$ affords the optimum convolution sidewall curvature.

It is significant to note in FIGURE 5 that the angle $b$ between the center line of each convolution 34 and lines normal to the bellows axis are equal at the crests and roots and that the convolution sidewalls 36, 38 are parallel to one another at both the convolution crests and roots. According to the preferred practice of the invention, the width dimension S of each convolution crest and root is made as small as possible. These width dimensions, of course, are limited by the sharpness to which the material of the bellows can be bent without cracking. With some materials, notably austenitic stainless steel, these dimensions may be made approximately equal to the thickness of the bellows material.

It is evident at this point that the deflection ratio of the present bellows is a direct function of the pitch P of the bellows convolution 34 in the as-formed mode of partial deflection of the bellows. Accordingly, increasing the as-formed pitch of the bellows increases its deflection ratio. It is highly desirable, therefore, to make the as-formed pitch as large as possible. It has been determined, however, that this pitch has a maximum limit which cannot be exceeded without rendering difficult or impossible forming of the bellows, at least by conventional bellows forming techniques. Thus, it has been determined that as the as-formed pitch approaches and exceeds the radial height $h$ of the bellows convolutions, the angles $b$ at the convolution crests and the corresponding angles at the convolution roots become so large as to make forming of the bellows very difficult. In this regard, for example, it will be observed in FIGURE 5 that increasing the angle $b$ increases the effective overhang $f$ of the convoluting. It is obvious that such overhang will cause interference during removal of the bellows from its forming die. Some interference can be tolerated, of course, because of the elasticity of the bellows material. However, the maximum interference which may be tolerated is obviously limited. Another limitation on increasing the as-formed pitch of the bellows resides in the increased arching of the bellows convolutions 34 in their nested positions of FIGURE 6 which results from increasing the as-formed pitch of the bellows. Thus, the arching $m$ of the convolutions in their nested condition is approximately proportional to the as-formed pitch when the width dimension S of the bellows convolutions is small. Increasing the ratio of the arching $m$ to the radial height of the bellows convolutions diminishes the nesting capability of the convolutions because of the interference which is created at the convolution crests and roots due to the material thickness and the increased angle $b$. It is for the above reasons that the maximum as-formed pitch $p$ of the bellows approximates the radial height of the bellows convolutions when the maximum deflection ratio is desired.

As noted earlier, bellows according to the invention may be fabricated by any of the conventional bellows fabricating techniques. For example, the bellows may be hydraulically formed in its partially extended mode in much the same way as conventional bellows are hydraulically formed, the only change being that the forming rings of the hydraulic forming die are provided with the appropriate shape to produce the above described convolution contour of the invention. Deposit or electrolytic forming of the present bellows is accomplished in the usual manner with one minor exception. Thus, previous to the present invention, the form or mandrel employed in the electrolytic bellows forming process has been turned on a lathe with the aid of a cutting tool which is fed into the mandrel normal to its axis. According to the present invention, this method of turning the mandrel is modified to the extent that the cutting tool employed in shaping the mandrel is replaced by the cutting tool 50 illustrated in FIGURE 9. This cutting tool has a shank 52 and a cutting tip 54 extending from one end of the shank. Two opposite sides of this cutting tip are defined by a concave side face 56 and an oppositely presented convex side face 58. One remaining side of the cutting tip is defined by generally planar edge face 60. The concave face 56 of the cutting tip intersects the planar edge face 60 to define a concave cutting edge 64. Similarly, the convex face 58 of the tip intersects the planar edge face 60 to define a convex cutting edge 66. The cutting tip 54 also has a convex tip face 68 which intersects the planar face edge 60 to define a convex, generally semi-circular cutting edge 70.

The cutting tool 50 is employed in conjunction with a lathe for turning, to the proper bellows forming shape, the mandrel which is employed in the electrolytic deposition process of forming the bellows. More specifically, the tool 50 is employed to turn or cut into the mandrel a series of axially spaced circumferential grooves which define therebetween circumferential lands or rings of the proper shape to form the convolutions 34 of the present bellows when the bellows material is electrolytically deposited on the mandrel. To this end, the concave cutting edge 64 of the tool 50 is shaped to match the external as-formed curvature (FIGURE 5) of each convolution sidewall 38. Similarly, the convex cutting edge 66 of the tool is shaped to match the external as-formed curvature of each convolution side wall 36. The end cutting edge 70 of the tool is shaped to match the circular curvature of each root wall 42 of the bellows.

It is obvious from FIGURE 9 that the cutting tool 50 cannot be fed radially into a bellows forming mandrel, normal to the mandrel axis, in the same manner as the cutting tools which are employed to shape the electrolytic forming mandrels for conventional bellows. According to the present invention, the cutting tip 54 of the tool 50 is fed into the work by rotating the tool about an axis A which is so oriented as to enable the cutting tip to enter and retract from the mandrel without interference. To this end, the axis A is so situated that the radial distance from the axis to the concave cutting edge 64 of the tool progressively increases in a direction from the tool shank 52 to the end cutting edge 70 and the radial distance from the axis to the convex cutting edge 66 progressively diminishes from the shank to the end cutting edge. It is evident from this description that the cutting tip 54 may be fed into and retracted from the mandrel, to properly shape the mandrel for deposit forming of a bellows thereon, by rotating the tool about the axis A.

It is obvious from the preceding description, that the mandrel surfaces on which the convolution sidewalls 36, 38 are electrolytically deposited are cut or shaped by the cutting edges 64, 66, respectively, of the cutting tool 50. The mandrel surfaces on which the convolution root walls 42 are electrolytically deposited are cut or shaped by the end cutting edge 70 of the cutting tool. The outer perimeters or circumferential edges of the lands defined between the grooves are rounded to define deposit forming surfaces for the crest walls 40 of the bellows convolutions by the illustrated curved portions 64a, 66a of the cutting edges 64, 66 adjacent the tool shank 52.

Bellows according to the invention may also be fabricated by a welding technique. In this case, a number of annular rings 36b, 38b (FIGURE 10) are stamped from sheet metal or otherwise formed to curvatures corresponding to those of the convolution sidewalls 36, 38 of the bellows 30 described earlier. These rings are then arranged in alternate sequence and are welded to one another about their inner and outer perimeters in such manner that the outer perimeter of one adjacent ring 38b and the inner perimeter of each ring 36b is welded to the inner perimeter of the other adjacent ring 38b, thus to form a completed unitary bellows of the kind illustrated in FIGURE 10. This welded bellows obviously possesses all of th beneficial features of the bellows described earlier.

It is now evident that the invention herein described and illustrated is fully capable of attaining the several objects and advantages preliminarily set forth.

What is claimed as new in support of Letters Patent is:
1. A flexible bellows characterized by a relatively large deflection ratio, comprising:
  a hollow, generally convoluted body including a number of axially spaced convolutions having annular flexible sidewalls disposed in spaced coaxial side by side relation along the axis of said body and each having radially inner and outer annular boundary wall portions and an intervening annular wall portion which constitutes the major portion of the respective sidewall, said sidewalls being joined to one another in such manner that the outer boundary wall portion of each sidewall is joined to the outer boundary wall portion of one adjacent sidewall to form with said adjacent sidewall one convolution of said body and the inner boundary wall portion of each sidewall is joined to the inner boundary wall portion of the other adjacent sidewall;

the joined outer boundary wall portions of said sidewalls defining convolution crests and the joined inner boundary wall portions of said sidewalls defining convolution roots;

said body being axially compressible and extensible between a first limiting mode of extreme compression and a second limiting mode of extreme extension and through an intermediate mode of partial extension;

said convolution sidewalls being curved in such a way that the intersection of said intervening major annular wall portion of each sidewall with a plane containing said body axis defines a pair of generally similar arcuate sidewall sections which are located at opposite sides of and are generally symmetrical about said axis;

said sidewall sections having substantially the same arcuate shape in said partially extended mode of said body, and the curvature of each section progessively increasing in one direction along the section throughout at least one end portion of the section and the curvature of the remaining portion of the section being at least constant such that each section is devoid of any curvature reversals, whereby in said latter mode said convolution side walls have external concave and convex sides, and annular regions of pronounced curvature adjacent one perimeter of the respective walls;

said convolution sidewalls being disposed with their concave sides facing one end of said body;

each convolution having a first sidewall presented toward said body end and a second sidewall presented toward the opposite body end; and the curvature of said first and second convolution sidewalls being reversed in such manner that said pronounced curvature regions of said first convolution sidewalls are located adjacent the respective convolution crests and said pronounced curvature regions of said second convolution sidewalls are located adjacent the respective convolution roots.

2. A bellows according to claim 1 wherein:

the curvature of each said side wall section progressively increases throughout its entire length.

3. A flexible bellows characterized by a relatively large deflection ratio, comprising:

a hollow, generally convoluted body including a number of axially spaced convolutions having annular flexible sidewalls disposed in spaced coaxial side by side relation along the axis of said body and joined to one another in such manner that each sidewall is joined along its outer perimeter to one of its respective adjacent sidewalls to form with said adjacent sidewall one convolution of said body and each sidewall is joined along its inner perimeter to the other adjacent sidewall;

the joined outer perimeters of said sidewalls defining convolution crests and the joined inner perimeters of said sidewalls defining convolution roots;

said body being axially compressible and extensible between a first limiting mode of extreme compression and a second limiting mode of extreme extension and through an intermediate mode of partial extension;

each convolution having a first sidewall presented toward said body end and a second sidewall presented toward the opposite body end;

said first convolution sidewalls having radially inner generally frusto-conical wall portions adjacent the roots of the respective convolutions and radially outer arcuate wall portions of generally constant radius of curvature adjacent the crests of the respective convolutions; and said second convolution sidewalls having radially outer generally frusto-conical wall portions adjacent the crests of the respective convolutions; and radially inner arcuate wall portions of generally constant radius of curvature adjacent the roots of the respective convolutions.

4. A bellows according to claim 1 wherein:

said joined outer boundary wall portions of the sidewalls of each convolution comprise an arcuate crest wall which merges tangentially with the respective intervening sidewall portions; and said joined inner boundary wall portions of the adjacent sidewalls of adjacent convolutions comprise arcuate root walls which merge tangentially with the respective intervening sidewall portions.

5. A bellows according to claim 1 wherein:

the sidewalls of each convolution are welded to one another along their outer perimeters and the adjacent sidewalls of adjacent convolutions are welded to one another along their inner perimeters.

6. A bellows according to claim 1 wherein:

each of said convolution sidewall sections conforms approximately to a curve which represents the summation of one half a sine wave of given amplitude and having a half length equal to the convolution height and a curve which defines the curvature of a column having a length equal to the convolution height and fixed ends which are laterally translated relative to one another a distance equal to one half the relative displacement adjacent convolution crests occasioned by deflection of said bellows between said limiting mode of extreme compression and said partial deflection mode.

7. A bellows according to claim 1 wherein:

each of said convolution sidewall sections conforms approximately to a curve Y represented by the equation:

$$Y = g \sin \pi \frac{x}{h} + \frac{E}{2}\left(1 + \cos \pi \frac{x}{h}\right)$$

where:

E is one half the relative axial displacement of adjacent convolution crests occasioned by axial deflection of said bellows between said limiting mode of extreme compression and said partial deflection mode, $h$ is the convolution height, $x$ is a variable which may range from zero to $h$, and $g$ is a constant equal to the amplitude of a preselected sine wave having a half length equal to $h$.

References Cited

UNITED STATES PATENTS

| | | | |
|---|---|---|---|
| 2,086,819 | 7/1937 | Persons | 92—40 |
| 2,323,985 | 7/1943 | Fausek et al. | 92—42 |
| 2,811,173 | 10/1957 | Benson | 92—45 |

PAUL E. MASLOUSKY, Primary Examiner

U.S. Cl. X.R.

29—95